US005698613A

United States Patent [19]

Jhaveri

[11] Patent Number: 5,698,613
[45] Date of Patent: Dec. 16, 1997

[54] CHEMICAL BINDER

[75] Inventor: Satish S. Jhaveri, Oakville, Canada

[73] Assignee: Mancuso Chemicals Limited, Niagara Falls, Canada

[21] Appl. No.: 391,039

[22] Filed: Feb. 21, 1995

[51] Int. Cl.$^6$ .................................................. B22C 1/20
[52] U.S. Cl. .......................... 523/139; 523/142; 523/148
[58] Field of Search ................................. 523/139, 142, 523/141, 148

[56] References Cited

U.S. PATENT DOCUMENTS

| | | | |
|---|---|---|---|
| 3,409,579 | 11/1968 | Robins . | |
| 3,498,824 | 3/1970 | Robins . | |
| 3,590,906 | 7/1971 | Bayliss et al. | 164/200 |
| 3,676,392 | 7/1972 | Robins . | |
| 3,702,316 | 11/1972 | Robins . | |
| 3,919,162 | 11/1975 | Austin . | |
| 3,933,727 | 1/1976 | Schmid . | |
| 3,937,272 | 2/1976 | Flora et al. | 164/159 |
| 3,943,991 | 3/1976 | Edwards | 164/21 |
| 4,055,522 | 10/1977 | Ashida et al. . | |
| 4,061,472 | 12/1977 | Ozaki et al. | 208/40 |
| 4,066,588 | 1/1978 | Funabiki et al. | 164/43 |
| 4,079,773 | 3/1978 | Dunlop | 164/16 |
| 4,086,193 | 4/1978 | Reischl . | |
| 4,089,363 | 5/1978 | Dunlop | 164/16 |
| 4,296,213 | 10/1981 | Cuscurida et al. | 521/166 |
| 4,317,896 | 3/1982 | Holik | 525/501 |
| 4,383,973 | 5/1983 | Cheng | 422/151 |
| 4,469,824 | 9/1984 | Grigsby, Jr. et al. | 528/83 |
| 4,518,778 | 5/1985 | Cuscurida | 544/398 |
| 4,546,124 | 10/1985 | Laiter et al. | 523/143 |
| 4,655,903 | 4/1987 | Rahbe et al. | 208/96 |
| 4,725,661 | 2/1988 | Miyabayashi | 528/45 |
| 4,788,083 | 11/1988 | Dammann | 521/121 |
| 4,946,876 | 8/1990 | Carpenter et al. | 523/143 |
| 5,034,116 | 7/1991 | Newman | 208/131 |
| 5,132,339 | 7/1992 | Carpenter et al. | 523/143 |
| 5,147,925 | 9/1992 | Pears et al. | 524/589 |
| 5,189,079 | 2/1993 | Geoffrey et al. | 528/129 |
| 5,439,896 | 8/1995 | Ito et al. | 525/107 |
| 5,455,287 | 10/1995 | Carpenter et al. | 523/143 |

FOREIGN PATENT DOCUMENTS

| | | |
|---|---|---|
| 0552628 | 1/1993 | European Pat. Off. . |
| 0634433 | 6/1994 | European Pat. Off. . |
| 298645 | 3/1992 | Germany . |

OTHER PUBLICATIONS

Updating Resin Binder Processes—Part I, Paul R. Carey and Gregory P. Sturtz, undated, Ashland Chemical, Columbus, Ohio.

Updating Resin Binder Processes—Part II, Paul R. Carey and James J. Archibald, undated, Ashland Chemical, Columbus, Ohio.

*Primary Examiner*—Jeffrey Mullis
*Attorney, Agent, or Firm*—Fitzpatrick, Cella, Harper & Scinto

[57] ABSTRACT

A chemical binder comprising: an ester-based polyol; an isocyanate; and a catalyst capable of catalyzing a reaction between the ester-based polyol and the isocyanate. Preferably, the chemical binder is used in a mouldable mixture comprising a particulate aggregate and the chemical. Such a mouldable mixture would be in, for example, a disposable foundry mould or core. A process for producing a free-standing mould and a process for cast a metal are also described.

37 Claims, No Drawings

CHEMICAL BINDER

BACKGROUND OF THE INVENTION

1. Field of the Invention

This present invention relates to a chemical binder. More particularly, the present invention relates to a chemical binder for use in one or more of the foundry, abrasives, refractory and construction industries.

2. Description of the Prior Art

In the foundry industry, one of the processes used for making metal parts is sand casting. In sand casting, disposable foundry shapes (usually characterized as moulds and cores) are made by shaping and curing a foundry mix which is a mixture of sand and an organic or inorganic binder. The binder is used to strengthen the moulds and cores. It is to be understood that the term "mould", when used throughout this specification, is intended to have a broad meaning and includes generally any shaped article such as a foundry mould, a foundry core and the like.

One of the processes used in sand casting for making moulds and cores is known as the "no-bake" process. In this process, mixture or foundry mix comprising: (i) a foundry aggregate, (ii) a binder, and (iii) a liquid curing catalyst is initially prepared. The mixture is then compacted to produce a cured mould or core. In the no-bake process, it is important to formulate a foundry mix which will provide sufficient worktime to allow shaping before the onset of curing. Worktime is generally the time between when mixing begins and when the mixture can no longer be effectively shaped to fill a mould or core.

A binder commonly used in the no-bake process is a polyurethane binder derived by curing a polyurethane-forming binder with a liquid tertiary amine catalyst. Such polyurethane-forming binders used in the no-bake process have proven satisfactory for casting a variety of metals including iron and steel which are normally cast at temperatures exceeding about 1400° C. The known polyurethane-forming binders are also useful in the casting of lightweight metals, such as aluminium, which have melting points of less than 700° C.

Another of the processes used in sand casting for making moulds and cores is known as the "cold box" process. The chemistry involved in this process is generally similar to that of the no-bake process. The principal difference is that, in the cold box process, the foundry aggregate and the binder are initially mixed and shaped. Thereafter, a gaseous catalyst is diffused through the shaped mixture resulting in substantially immediate curing of the shaped mixture in the absence of applied heat. Suitable gaseous catalyst include tertiary amines such as triethyl amine and trimethyl amine.

Regardless of whether the no-bake or cold box process is used, conventional polyurethane-forming binders usually consist of a phenolic resin component and polyisocyanate component which are mixed with sand prior to compacting and curing. The phenolic resin components generally contain approximately 5% to 12% by weight of free phenol, free formaldehyde and organic solvent, all of which can are obnoxious to smell and, in some cases, can create environmental and/or toxicological problems.

Accordingly, it would be desirable to have a chemical binder, preferably for use in a foundry mix, which was free of such disadvantages. Ideally, the chemical binder would be free of one or more of phenol, formaldehyde and organic solvents. It would be advantageous if the chemical binder was readily adapted for use in a no-bake or cold box process.

SUMMARY OF THE INVENTION

It is an object of the present invention to provide a novel chemical binder which obviates or mitigates at least one of the above-mentioned disadvantages of the prior art.

It is another object of the present invention to provide a novel mouldable mixture.

It is yet another object of the present invention to provide a novel process for producing a free-standing mould.

It is yet another object of the present invention to provide a novel process for casting metal.

Accordingly, in one of its aspects, the present invention provides a chemical binder comprising:
- an ester-based polyol;
- an isocyanate; and
- a catalyst capable of catalyzing a reaction between the ester-based polyol and the isocyanate.

In another of its aspects, the present invention provides a mouldable mixture comprising:
- a particulate aggregate; and
- a chemical binder comprising: an ester-based polyol; an isocyanate; and a catalyst capable of catalyzing a reaction between the ester-based polyol and the isocyanate.

In yet another of its aspects, the present invention provides a process for producing a free-standing mould comprising the steps of:
- providing a mouldable composition comprising a particulate aggregate and a chemical binder, the chemical binder comprising: an ester-based polyol; an isocyanate; and a catalyst capable of catalyzing a reaction between the ester-based polyol and the isocyanate;
- shaping the mouldable composition to provide a mould; and
- allowing the mould to cure to provide a free-standing mould.

In yet another of its aspects, the present invention provides a process for producing a free-standing mould comprising the steps of:
- providing a mouldable composition comprising a particulate aggregate, an ester-based polyol and an isocyanate;
- shaping the mouldable composition to provide a mould;
- diffusing through the mould a catalyst capable of catalyzing a reaction between the ester-based polyol and the isocyanate; and
- allowing the mould to cure to provide a free-standing mould.

In yet another of its aspects, the present invention provides a process for casting metal comprising the steps of:
- providing a particulate aggregate;
- providing a chemical binder comprising: an ester-based polyol; an isocyanate; and a catalyst capable of catalyzing a reaction between the ester-based polyol and the isocyanate;
- mixing the particulate aggregate and the chemical binder to provide a mouldable composition;
- shaping the mouldable composition to provide a mould;
- allowing the mould to cure to provide a free-standing mould;
- dispensing liquid metal into the mould;
- allowing the liquid metal to assume the shape of the mould; and
- cooling the liquid metal to produce a shaped metal article.

In yet another of its aspects, the present invention provides a process for casting metal comprising the steps of:

providing a mouldable composition comprising a particulate aggregate, an ester-based polyol and an isocyanate;

shaping the mouldable composition to provide a mould;

diffusing through the mould a catalyst capable of catalyzing a reaction between the ester-based polyol and the isocyanate;

dispensing liquid metal into the mould;

allowing the liquid metal to assume the shape of the mould; and cooling the liquid metal to produce a shaped metal article.

DETAILED DESCRIPTION OF THE PREFERRED EMBODIMENTS

Accordingly, an aspect of the present invention relates to the provision of a chemical binder comprising: an ester-based polyol; an isocyanate; and a catalyst capable of catalyzing a reaction between the ester-based polyol and the isocyanate. Preferably, components are kept separate until they are intended to be used. Thus, when the present chemical binder is used to manufacture, for example, a mould, the components of the chemical binder are mixed with a suitable aggregate, shaped into the mould and allowed to cure—this is the no-bake process described hereinabove. Alternatively, the catalyst can be set aside while the polyol, isocyanate and aggregate are mixed and shaped into the mould. Thereafter, the catalyst is diffused through the shaped mould to effect curing thereof—this is the cold box process described above.

As used throughout this specification, the term "ester-based polyol" is intended to have a broad meaning and encompasses polyols produced by a condensation reaction between hydroxyl-containing compound and a di-carboxylic-acid compound. Such polyols are known and have been used for a number of years in the manufacture of polyurethane foams. Applicant has discovered that a particular subset of ester-based polyols has unexpected utility in the production of foundry moulds or cores. Preferably, the ester-based polyol for use in the invention is substantially completely free of one or more of phenol-based polyols, phenol, formaldehyde and organic solvents such as $C_3-C_{20}$ esters and $C_1-C_{20}$ alcohols. It will, however, be appreciated by those of skill in the art that minor amounts (e.g. total of up to about 10% by weight) of these components may be present in the ester-based polyol without affecting the performance of the binder and departing from the spirit of the invention.

Thus, non-limiting examples of the ester-based polyol suitable for use in the present invention include:

1. Poly(ethylene adipates),
2. Lightly branched poly(diethyleneglycol adipates),
3. Adipates made with more than one aliphatic diol,
4. Mixed polyadipates from hydrogenated AGS (adipic, glutaric and succinic) acids,
5. Aromatic polyester polyols, including those at least partly based scrap polyethylene terephthalate and/or dimethyl terephthalate process waste,
6. Polycaprolactone diols,
7. Polycarbonate diols,
8. Halogen-containing polyester polyols, including those made from halogenated diols and diacids,
9. Polyols based on phthalic anhydride,
10. Polyols based on isophthalic acid,
11. Polyols based on terephthalic acid,
12. Mixtures of two or more of these.

The preferred ester-based polyol for use in the present invention will have one or more, more preferably all, of the following properties: (i) a hydroxyl number greater that about 200, more preferably in the range of from about 230 to about 600, most preferably in the range of from about 400 to about 600, (ii) a viscosity in the range of from about 100 to about 120,000 cps, more preferably from about 100 to about 3000, most preferably from about 1000 to about 1200 cps, (ii) an acid number less than about 2.0, (iv) a functionality in the range of from about 2.0 to about 2.5, and (v) an aromaticity in the range of from about 30 to about 40. More particularly, Applicant has discovered that ester-based polyols having a hydroxyl number in the range of from about 400 to about 600 are surprising and unexpectedly useful to produce foundry moulds and cores.

The polyhydroxy functional group in the polyol may be derived from any suitable hydroxyl-containing compound. Non-limiting examples of a suitable hydroxyl-containing compound may be selected from the group consisting of 1,3-butane diol, 1,4-butane diol, 1,2-cyclohexanedimethanol, 1,3-cyclohexanedimethanol, 1,4-cyclohexanedimethanol, dimethylol propionic acid, dipropylene glycol, diethylene glycol, ethylene glycol, 1,6-hexanediol, hexylene glycol, neopentyl glycol, 1,5-pentanediol, propylene glycol, tetraethylene glycol, triethylene glycol, trimethylene glycol, trimethylpentanediol, glycerine, trimethylol ethane, trimethylol propane, pentaerythritol and mixtures of two or more of these.

Preferably, the hydroxyl-containing compound is a polyhydroxyl compound with an average functionality of from 2 to 4. Non-limiting examples of such preferred polyhydroxyl compound include glycerine, trimethylol ethane, trimethylol propane, pentaerythritol and mixtures thereof.

More preferably, the ester-based polyol is an aromatic polyester polyol produced by reacting an alcohol with an aromatic compound selected from the group consisting of polyethylene terphthalate (PET), phthalic anhydride, isophthalic acid, dimethyl terphthalate (DMT) and mixtures thereof. More preferably, the alcohol is a glycol. The most preferred ester-based polyol is an aromatic polyester polyol produced by reacting diethylene glycol with polyethylene terphthalate (PET)—it has been surprisingly and unexpectedly found that the use of this particular combination of polyol results in particularly beneficial results when the binder is used to produce a foundry mould or core.

The ester-based polyol can be used neat or diluted with one or more suitable solvents such as an ester (e.g. dibasic ester, propylene carbonate, diacetone alcohol and mixtures thereof) or an alcohol (e.g. isopropyl alcohol, methanol and mixtures thereof). The suitable solvent can be used alone or in admixture with one or more other solvents.

The isocyanate suitable for use in the chemical binder is not particularly restricted and the choice thereof is within the purview of a person skilled in the art. Generally, the isocyanate compound suitable for use may be represented by the general formula:

Q(NCO)$_i$ wherein i is an integer of two or more and Q is an organic radical having the valence of i. Q may be a substituted or unsubstituted hydrocarbon group (e.g. an alkylene or arylene group). Moreover, Q may be represented by the general formula:

$Q^1-Z-Q^1$ wherein $Q^1$ is an alkylene or arylene group and Z is chosen from the group comprising —O—, —O—$Q^1$—, —CO—, —S—, —S—$Q^1$—S— and —$SO_2$—. Examples of isocyanate compounds which fall within the scope of this definition include hexamethylene diisocyanate, 1,8-diisocyanato-p-methane, xylyl diisocyanate, $(OCNCH_2CH_2CH_2OCH_2O)_2$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4',4"-triisocyanate and isopropylbenzene-alpha-4-diisocyanate.

In another embodiment, Q may also represent a polyurethane radical having a valence of i. In this case Q(NCO)$_i$ is a compound which is commonly referred to in the art as a prepolymer. Generally, a prepolymer may be prepared by reacting a stoichiometric excess of an isocyanate compound (as defined hereinabove) with an active hydrogen-containing compound (as defined hereinafter), preferably the polyhydroxyl-containing materials or polyols described below. In this embodiment, the polyisocyanate may be, for example, used in proportions of from about 30 percent to about 200 percent stoichiometric excess with respect to the proportion of hydroxyl in the polyol.

In another embodiment, the isocyanate compound suitable for use in the process of the present invention may be selected from dimers and trimers of isocyanates and diisocyanates, and from polymeric diisocyanates having the general formula:

[Q"(NCO)$_i$]$_j$ wherein both i and j are integers having a value of 2 or more, and Q" is a polyfunctional organic radical, and/or, as additional components in the reaction mixture, compounds having the general formula:

L(NCO)$_i$ wherein i is an integer having a value of 1 or more and L is a monofunctional or polyfunctional atom or radical. Examples of isocyanate compounds which fall with the scope of this definition include ethylphosphonic diisocyanate, phenylphosphonic diisocyanate, compounds which contain a =Si—NCO group, isocyanate compounds derived from sulphonamides ($QSO_2NCO$), cyanic acid and thiocyanic acid.

See also for example, British patent No. 1,453,258, the contents of which are incorporated herein by reference.

Non-limiting examples of suitable isocyanates include: 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitolylene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polyisocyanates and mixtures thereof. A more preferred isocyanate is selected from the group comprising 2,4-toluene diisocyanate, 2,6-toluene diisocyanate and mixtures thereof, for example, a mixture comprising from about 75 to about 85 percent by weight 2,4-toluene diisocyanate and from about 15 to about 25 percent by weight 2,6-toluene diisocyanate. Another more preferred isocyanate is selected from the group comprising 2,4'-diphenylmethane diisocyanate, 4,4'-diphenylmethane diisocyanate and mixtures thereof. The most preferred isocyanate is a mixture comprising from about 15 to about 25 percent by weight 2,4'-diphenylmethane diisocyanate and from about 75 to about 85 percent by weight 4,4'-diphenylmethane diisocyanate. Such isocyanates are readily available from a variety of known commercial sources.

Preferably, the isocyanate has an average functionality of from about 2.0 to about 2.9 and % NCO content in the range of from about 18 to about 32. The isocyanate can be used neat or can be diluted with one or more suitable solvents such as an ester, an aliphatic hydrocarbon, aromatic hydrocarbon and mixtures thereof. Non-limiting examples of suitable solvents include propylene carbonate; toluene, xylene, kerosene, other high boiling aromatic solvents such as those commercially available from Esso Chemical Canada under the tradenames Solvesso 100, 150, 200 and the like).

Generally, the catalyst used in the present chemical binder is a compound capable of catalyzing a reaction between the ester-based polyol and the isocyanate. Such catalysts are known, and the choice and concentration thereof is within the purview of a person skilled in the art. See for example U.S. Pat. Nos. 4,296,213 and 4,518,778, the contents of each of which is incorporated herein by reference.

In the embodiment of the invention relating to a chemical binder for use in manufacturing a foundry mould or core using the no-bake process, non-limiting examples of suitable catalysts include tertiary amines and/or organometallic compounds. The preferred such catalyst is a tertiary amine which can be supplied alone and then mixed with the polyol and/or aggregate, or pre-mixed with the polyol. Non-limiting examples of a tertiary amine suitable for use in this embodiment the present chemical binder may be selected from the group consisting of N,N-dimethylaminoethanol, N,N-dimethylcyclohexylamine, bis-(2-dimethylaminoethyl) ether, N,N,N',N',N"-pentamethyldiethylene triamine, N,N-dimethylbenzylamine, N,N-dimethylcetylamine, diaminobicyclooctane, potassium octoate, potassium acetate, stannous octoate, dibutyltin dilaurate, dibutyltin mercaptide, dibutyltin thiocarboxylates, dioctyltin thiocarboxylates, phenylmercuric propionate, imidazoles, substituted imidazoles (e.g. $C_1$–$C_{10}$ alkyl and vinyl substituent imidazoles such as N-methyl imidazole and 1-methylbenzimidazole), lead octoate, alkali metal salts (e.g. $CH_3COOK$, $K_2CO_3$, $NaHCO_3$ and $Na_2CO_3$ and the like), calcium carbonate, ferric acetylacetonate and 4-alkyl pyridines wherein the alkyl group as one to four carbon atoms. Non-limiting examples of such 4-alkyl pyridines suitable for use in the present binder include phenyl pyridine, acridine, 2-methoxypyridine, pyridazine, 3-chloropyridine, quinoline, 4,4-dipyridine, 1,4-thiazinc and 4-phenylpropylpyridine. The preferred catalyst is 4-phenylpropylpyridine. The catalyst can be used neat or diluted with a suitable solvent such as an aromatic solvent, an aliphatic solvent or a mixture of such solvents. Of course, it will be understood by those skilled in the art that a combination of two or more catalysts may be suitably used.

When the present chemical binder is to be used in a no-bake foundry application, it is preferred that the binder comprise a ratio from about 35 to about 65 percent by weight ester-based polyol, from about 65 to about 35 percent by weight isocyanate and from about 1 to about 10 percent by weight catalyst based upon the weight of total binder. More preferably, such a binder comprises a ratio from about 40 to about 60 percent by weight ester-based polyol, from about 60 to about 40 percent by weight isocyanate and from about 1 to about 8 percent by weight catalyst based upon the weight of total binder. Most preferably, such a binder comprises from about 46 to about 54 percent by weight ester-based polyol, from about 54 to about 46 percent by weight isocyanate and from about 2 to about 6 percent by weight catalyst based upon the weight of the total binder.

In the embodiment of the invention relating to a chemical binder for use in manufacturing a foundry mould using the cold box process, non-limiting examples of suitable catalysts include gaseous compounds such as one or more of triethylamine (TEA), dimethylethylamine (DMEA), trimethyl amine (TMA) and the like. The choice the particular catalyst is within the purview of a person skilled in the art and will depend on factors such as the desired curing speed and the like. The catalyst can be used neat or diluted with a suitable carrier gas as dry air or an inert gas such as nitrogen, carbon dioxide and the like. If the catalyst is diluted with a carrier gas, it is preferred that the resulting composition comprise up to about 15% by weight, more preferably from about 3% to about 15% by weight catalyst with the remainder being carrier gas. Of course it will be understood by those skilled in the art that a combination of two or more catalysts may be suitably used. More information on the choice and amount of catalysts for use in the cold box process may found in U.S. Pat. Nos. 3,409,579 and 3,919,162, the contents of which are hereby incorporated by reference.

When the present chemical binder is to be used in a cold box foundry application, it will be appreciated by those of skill in the art that the catalyst be kept out of contact with the combination of the ester-based polyol and isocyanate until such time as it is desired to produce the foundry mould or core. In this embodiment of the invention, the chemical binder can be viewed as a kit or system of components which, when combined with a suitable aggregate, can be shaped and made into a foundry mould or core. Preferably, the kit or system may comprise the ester-based polyol and isocyanate as independent components which are combined just prior to production of the foundry mould or core. In either case, the catalyst is supplied independently until it is used to catalyze the should foundry mould or core. Accordingly, in this embodiment of the invention, it is preferred that the binder comprise from about 35 to about 65 percent by weight ester-based polyol and from about 35 to about 65 percent by weight isocyanate and, independently, a catalyst as described in the previous paragraph. More preferably, such a binder comprises from about 40 to about 60 percent by weight ester-based polyol and from about 40 to about 60 percent by weight isocyanate and, independently, a catalyst as described in the previous paragraph. Most preferably, such a binder comprises from about 45 to about 55 percent by weight ester-based polyol and from about 45 to about 55 percent by weight isocyanate and, independently, a catalyst as described in the previous paragraph.

As will be clearly understood by those of skill in the art, it is contemplated that conventional additives in the isocyanate-based and/or polyol polymer art be used in the present chemical binder. Non-limiting examples of such additives include: release agents (e.g. silicones, silanes, waxes, fatty acids and the like), humidity resistant compounds (e.g. silicones, cabodiimide, molecular sieve and the like), surfactants (e.g. organo-silicone compounds such as those available under the tradename L-540 Union Carbide), extenders (e.g. halogenated paraffins such as those commercially available as Cereclor S45), cross-linkers (e.g. low molecular weight reactive hydrogen-containing compositions), pigments/dyes, flame retardants (e.g. halogenated organo-phosphoric acid compounds), inhibitors (e.g. weak acids), anti-oxidants, and plasticizers/stabilizers (e.g. sulphonated aromatic compounds). The amounts of these additives conventionally used would be within the purview of a person skilled in the art.

The manner by which the chemical binder is prepared is not particularly restricted as regards the order of addition of the components. Generally, the manner by which the chemical binder is prepared will depend, at least in part, on the intended use thereof.

Thus, if the chemical binder is intended to be used in a foundry application, as described hereinabove, the two conventional techniques are the no-bake process and the cold box process.

When using the chemical binder in the no-bake process, it is preferred to initially mix the catalyst with a particulate aggregate. The ester-based polyol and the isocyanate are added in successive stages. The components are mixed well for a short period (e.g. less than 10 minutes, preferably less than 5 minutes) in each stage prior to addition of each component. After the isocyanate has been added and mixed with the other components, the mixture is moulded and allowed to cure. Generally, the period of time to effect sufficient curing is from about 3 to about 20 minutes. It will be clear to those of skill in the art that modifications to the process are possible. For example, it is known in the art to supply polyol which is premixed with catalyst. In the context of the present chemical binder, it is possible to premix the ester-based polyol with a catalyst. Such a polyol would then be mixed, successively, with the particulate aggregate and the isocyanate.

When using the chemical binder in the cold box process, it is preferred to initially mix the ester-based polyol with the aggregate followed by addition of the isocyanate. The components are mixed well for a short period (e.g. less than 10 minutes, preferably less than 5 minutes). The mixture is moulded and the gaseous catalyst is diffused therethrough. The moulded mixture is then allowed to cure. Generally, the period of time to effect sufficient curing is from about 3 to about 25 seconds or more. More information on the cold box process may be found in U.S. Pat. Nos. 3,702,316, 3,919,162, 3,933,727, 3,937,272, 4,079,773 and 4,089,363, the contents of each of which are hereby incorporated by reference.

When use in, inter alia, a foundry application, the mouldable mixture of the present invention comprises a particulate aggregate and the chemical binder described hereinabove. The choice of particulate aggregate is not specifically restricted. Ideally the particulate aggregate will be substantially inert to the reaction of components in the chemical binder. A suitable particulate aggregate may be selected from the group consisting of sand, silica (e.g. in the form of sand), silicon carbide, aluminum oxide (e.g. $Al_2O_3$), magnesium oxide, calcium carbonate, talc, zircon, olivine, aluminosilicate sand, chromite sand, ceramics such as refractory oxides, carbides, and nitrides, silicide such as aluminum oxide, lead oxide, chromic oxide, zirconium oxide, silicon carbide, titanium nitride, boron nitride, molybdenum disilicide and the like, and carbonaceous material such as graphite. Of course, it will be readily appreciated by those of skill in the art that mixtures of two or more of such aggregates can be used.

Foundry moulds made using the chemical binder and mouldable composition of the present invention may be used to east virtually any metal such as iron, brass, stainless steel, aluminum, copper, bronze, magnesium, manganese alloy and gold. The manner by which this can be done is within the purview of a person skilled in the art.

The manner by which the mouldable mixture is prepared is not specifically restricted. It is contemplated that the particulate aggregate is initially mixed with one or more ingredients of the chemical binder. Specifically, it is preferred that the particulate aggregate is initially mixed with the catalyst and the ester-based polyol of the chemical binder. Thereafter, the isocyanate of the chemical binder is added to the mixture which is then capable of being moulded to the desired shape.

As discussed hereinabove, in the embodiment of the invention relating to a chemical binder for use in manufacturing a foundry mould, it is especially preferred to use an ester-based polyol derived from the condensation reaction between diethylene glycol and polyethylene terephthalate (PET). A number of advantages accrue from such a chemical binder, including:

1. The polyol can be produced using recycled PET (e.g. from X-ray film and soft drink bottles) thereby providing a net benefit to the environment. It will be appreciated, however, that some or even all of the PET can be virgin PET.
2. Due to the relatively high aromaticity of mould based on such a chemical binder, at metal pouring temperatures, a higher hot strength is possible. This is important since very few organic compounds can withstand metal pouring temperatures.
3. The polyol use to produce such a chemical binder is free of phenol and formaldehyde. This results in considerable improvement in the working environment, reduced odour and elimination of exposure to the toxic fumes of phenol and formaldehyde.
4. Sand used as an aggregate with the chemical binder can be reclaimed and reused. Waste from moulds manufactured using the chemical binder can be recycled with minimal or no risk of toxicity in road works and as cement additives. Further, the present chemical binder is relatively non-toxic compared to binders currently being used in the foundry industries and abrasives industries.
5. The chemical binder can be use in existing phenolic poly-based urethane, no-bake and cold box equipment with minimal or no additional capital expense.
6. A mould manufactured using such a chemical binder is characterized by significant reduced smoke emissions during metal pouring and thermal decomposition when compared to a mould manufactured using a chemical binder based on a phenolic polyol/isocyanate system. This results in a further environmental benefit associated with the present chemical binder.

Embodiments of the invention will be described with reference to the following Examples. It should be clearly understood that the Examples are exemplary in nature and should not be used to limit the scope of the present invention.

In the Examples, the following terms have the meanings indicated:

1. B.O.S.: Based on sand;
2. B.O.B.: Based on binder;
3. S.T.: Strip time;
4. W.T.: Work time;
5. P.S.I.: Pounds per square inch;
6. R.H.: Relative humidity;
7. R.T.: Room/ambient temperature; and
8. PBW: Parts by weight.

In the Examples the following compounds were used:

1. MANCU-SAT A-400 series, an polyol composition as detailed in Table 1;
2. MANCU-SAT B-500 series, a polymeric MDI composition as detailed in Table 2;
3. MANCU-SAT C-600 series, a catalyst composition as detailed in Table 3;
4. Rubinate M, an MDI commercially available from ICI Americas Inc.;
5. Rubinate 1820, an MDI commercially available from ICI Americas Inc.;
6. PAPI94, an MDI commercially available from the Dow Chemical Company;
7. RAP-B-025, an MDI commercially available from Mancuso Chemicals Limited (Niagara Falls, Ontario);
8. T-500, an ester-based polyol having a hydroxyl number of 500;
9. Stepanol® PS 4002, an ester-based polyol having a hydroxyl number of 390–410 and commercially available from Stepan Company (Northfield, Ill.);
10. RAP-A-015, a phenolic polyol commercially available from Mancuso Chemicals Limited (Niagara Falls Ontario);
11. Solvesso 100, a hydrocarbon solvent commercially available from Esso Chemical Canada (a division of Imperial Oil Limited);
12. Triethyl amine, a catalyst;
13. D.B.E., dibasic ester, a methyl ester of adipate guterate succinate commercially available from E.I. DuPont de Numours and Company;
14. SY, Sylphat™, a tall oil fatty acid commercially available from Hercules Chemicals; and
15. Diacetone alcohol, a solvent.

TABLE 1

| | Designation | |
|---|---|---|
| Component (PBW) | A-401 | A-402 |
| T-500 | 90 | 80 |
| Diacetone alcohol | 10 | 20 |

TABLE 2

| Component | Designation | | | | | |
|---|---|---|---|---|---|---|
| (PBW) | B-501 | B-502 | B-503 | B-504 | B-505 | B-506 |
| PAPI 94 | 100 | — | — | 90 | — | — |
| Rubinate 1820 | — | 100 | — | — | 90 | — |
| Rubinate M | — | — | 100 | — | — | 90 |
| Solvesso 100 | — | — | — | 10 | 10 | 10 |

TABLE 3

|  | Designation | |
| --- | --- | --- |
| Component (PBW) | C-601 | C-602 |
| 4-Phenylpropyl-pyridine | 25 | 50 |
| Solvesso 100 | 75 | 50 |

EXAMPLES 1–10

The following no-bake procedure was used in each of Examples 1–10. Initially, a mouldable composition was prepared by premixing an aggregate with a catalyst composition and a polyol composition. Mixing was effected for a period of about 1½ minutes. Thereafter an isocyanate composition was added to the mixture and mixing was continued for an additional 1½ minutes. The type and amount of aggregate, catalyst composition, polyol composition and isocyanate composition are detailed in Table 4.

The mouldable composition was dispensed in a No. 696 Tensile Core Box having 12 cavities. Generally the Core Box is designed for the study of self-curing or air-setting core binder systems. The Core Box was constructed of four complete 3-cavity, 1-inch thick, tensile core boxes positioned side by side in a wooden frame. Each 3-cavity aluminum core box was split for easy removal of the core specimens.

As is known in the art, a No. 696 Tensile Core Box can be used to produce specimens to measure the early development of strength and the build-up of tensile strength over a period of time. By producing specimens over varying timeframes, after discharge from the mixer, the length of effective work life or work life of the mix as reflected by the tensile strength can be readily determined. Thus, measuring the tensile strength of the "dogbone" or "dumbbell" shaped specimens (American Foundrymen's Society (AFS) standard) enables one to predict the suitability of the chemical binder in actual application for preparing moulds and cores. Testing conducted in Examples 1–10 was in accordance with Section 15 of the AFS Mold and Core Test Handbook (The American Foundrymen's Society, Des Plaines Il), the contents of which are hereby incorporated by reference.

Thus, the tensile strength of each specimen was tested in using a No. 612 Tensile Tester. The particular apparatus used was a motor-driven Tester capable of testing up to 1200 psi on a one inch thick AFS standard specimen. The loading rate was uniform and the Tester was able to load to full scale in 40 seconds.

The results of tensile testing of each specimen at various time periods after unloading from the mixer are reported (as an average of three tests) in Table 4. The results in Table 4 show that the Examples produced a composition useful to produce a foundry mould under a variety of conventional foundry conditions. Indeed a series of useful foundry moulds and castings produced therefrom were made.

EXAMPLE 11

In this Example the ester-based polyol was a composition comprising 90 PBW Stepanol® PS-4002 and 10 PBW diacetone alcohol. The isocyanate used was MANCU-SAT B-506 (see Table 2) and the catalyst used was MANCU-SAT C-602. The methodology described in Examples 1–10 was repeated using Lake AFS #50 sand to produce a number of dogbone or dumbbell shaped specimens. The components were used in the following amounts:

| Component | Amount (g) |
| --- | --- |
| Polyol composition | 18.75 |
| Isocyanate composition | 18.75 |
| Catalyst composition | 2.25 |
| Sand | 3000 |

Tensile testing of the specimens was conducted using the methodology described hereinabove in Examples 1–10. The results are as follows:

| Time Period | Tensile Strength (P.S.I.) |
| --- | --- |
| 15 minutes | 135.3 |
| 1 hour | 167.3 |
| 24 hours | 173.3 |

These results demonstrate that a useful foundry mould can be produced based on a mouldable composition consisting of the components used in this Example.

EXAMPLE 12

In this Example, a cold box process was used. The ester-based polyol was a composition comprising 70 PBW T-500, 13.7 PBW D.B.E., 14.7 PBW diacetone alcohol, 1.0 PBW SY and 0.3 PBW silane Z6040 (an epoxy silane) or silane A1120 (an amino silane). The isocyanate used was a composition comprising 100 PBW PAPI 94 and 0.6 PBW BPOD (benzene phosphorus oxydichloride). The catalyst composition used was triethyl amine diluted in nitrogen gas. The aggregate used was Lake AFS #50 sand.

The ester-based polyol composition, isocyanate composition and sand were place in a mixer in the following amounts:

| Component | Amount (g) |
| --- | --- |
| Polyol composition | 30 |
| Isocyanate composition | 30 |
| Sand | 4000 |

TABLE 4

| Example No./Type of Sand | Polyol (wt. % BOS) | Isocyanate (wt. % BOS) | Catalyst (wt. % BOB) | W.T. (min.) | S.T. (min.) | TENSILE STRENGTH (PSI) | | |
| --- | --- | --- | --- | --- | --- | --- | --- | --- |
|  |  |  |  |  |  | 15 min. | 1 hour | 24 hours |
| 1. Lake AFS #50 | A-401 0.625 | B-501 0.625 | C-601 6.0 | 6 | 8 | 75 | 188 | 166 |

TABLE 4-continued

| Example No./Type of Sand | Polyol (wt. % BOS) | Isocyanate (wt. % BOS) | Catalyst (wt. % BOB) | W.T. (min.) | S.T. (min.) | TENSILE STRENGTH (PSI) | | |
|---|---|---|---|---|---|---|---|---|
| | | | | | | 15 min. | 1 hour | 24 hours |
| 2. Lake AFS #50 | A-401 0.750 | B-501 0.750 | C-601 6.0 | 6½ | 9½ | 77 | 200 | 211 |
| 3. Lake AFS #50 | A-401 0.750 | B-502 0.750 | C-602 6.0 | 5½ | 7½ | 94 | 170 | 184 |
| 4. Silica AFS #70 | A-401 0.625 | B-502 0.625 | C-602 6.0 | 6 | 8 | 49 | 139 | 151 |
| 5. Badger FA554-5-62651 | A-401 0.625 | B-502 0.625 | C-602 6.0 | 5½ | 7½ | 94 | 170 | 184 |
| 6. Lake AFS #50 | A-402 | B-502 | C-602 | 5½ | 6½ | 79 | 185 | 196 |
| 7. Lake AFS #50 | A-401 0.625 | B-503 0.625 | C-601 6.0 | 6 | 7 | 79 | 157 | 109 |
| 8. Lake AFS #50 | A-402 0.625 | B-504 0.625 | C-602 6.0 | 7 | 9½ | 21 | 127 | 237 |
| 9. Lake AFS #50 | A-402 0.625 | B-505 0.625 | C-602 6.0 | 6½ | 9 | 29 | 150 | 230 |
| 10. Lake AFS #50 | A-402 0.625 | B-506 0.625 | C-602 6.0 | 6 | 7½ | 32 | 155 | 207 |

After adequate mixing of the components, they were dispensed into a cold box core adapted to include a gas injection jet in each specimen compartment. Once mixed components were dispensed into the Core Box, mixture in each specimen compartment was diffused for 5 seconds with the gaseous catalyst composition. Thereafter, each specimen compartment was purged with air for 15 seconds.

Tensile testing of the specimens was conducted using the methodology described hereinabove in Examples 1–10. The results, reported as the average tensile strength for two tests, are as follows:

| Time Period | Tensile Strength (P.S.I.) |
|---|---|
| Immediate | 76 |
| 5 minutes | 67 |
| 1 hour | 59 |
| 24 hours | 70 |

These results demonstrate that a useful foundry mould can be produced based on a mouldable composition consisting of the components used in this Example.

It should be understood that, while exemplary embodiments of the present invention have been described herein, the present invention is not limited to these exemplary embodiments, and that variations and other alternatives may readily occur to those of skill in the art without departing from the intended scope of the invention as defined by the attached claims. For example, those of skill in the art will readily understand that foundry moulds or cores made using the present chemical binder may be subjected to a mould or core wash application, as appropriate.

What is claimed is:

1. A non-foam chemical binder for foundry aggregate moulds, comprising:

an ester-based polyol consisting essentially of a reaction product produced by reacting an alcohol with an aromatic compound selected from the group consisting of polyethylene terephthalate, phthalic anhydride, dimethyl terephthalate, terephthalic acid and mixtures thereof, wherein the ester-based polyol is based on diethylene glycol and polyethylene terphthalate;

an isocyanate; and a catalyst capable of catalyzing a reaction between the ester-based polyol and the isocyanate, in which the binder is incapable of producing a foam upon curing.

2. The binder defined in claim 1, wherein the ester-based polyol has a hydroxyl number in the range of from about 400 to about 600.

3. The binder defined in claim 1, wherein the polyol contains a polyhydroxy functional group derived from a hydroxyl-containing compound.

4. The binder defined in claim 3, wherein the hydroxyl-containing compound is selected from the group consisting of 1,3-butane diol, 1,4-butane diol, 1,2-cyclohexanedimethanol, 1,3-cyclohexanedimethanol, 1,4-cyclohexanedimethanol, dimethylol propionic acid, dipropylene glycol, ethylene glycol, 1,6-hexanediol, hexylene glycol, neopentyl glycol, 1,5-pentanediol, propylene glycol, tetraethylene glycol, triethylene glycol, trimethylene glycol, trimethylpentanediol, glycerine, trimethylol ethane, trimethylol propane, pentaerythritol and mixtures of two or more of these.

5. The binder defined in claim 1, wherein the isocyanate is selected from the group consisting of 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitolylene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polyisocyanates and mixtures thereof.

6. The binder defined in claim 1, wherein the isocyanate is selected from the group consisting of 2,4-toluene diisocyanate, 2,6-toluene diisocyanate and mixtures thereof.

7. The binder defined in claim 1, wherein the isocyanate is selected from the group consisting of 2,4'-diphenylmethane diisocyanate, 4,4'-diphenylmethane diisocyanate and mixtures thereof.

8. The binder defined in claim 1, wherein the isocyanate is a mixture comprising from about 15 to about 25 percent by weight 2,4'-diphenylmethane diisocyanate and from about 75 to about 85 percent by weight 4,4'-diphenylmethane diisocyanate.

9. The binder defined in claim 1, wherein the catalyst is selected from the group consisting of N,N-dimethylaminoethanol, N,N-dimethylcyclohexylamine, bis-(2-dimethylaminoethyl) ether, N,N,N',N',N"-pentamethyldiethylene triamine, N,N-dimethylbenzylamine, N,N-dimethylcetylamine, diaminobicyclooctane, potassium octoate, potassium acetate, stannous octoate, dibutyltin dilaurate, dibutyltin mercaptide, dibutyltin thiocarboxylates, dioctyltin thiocarboxylates, phenylmercuric propionate, imidazoles, substituted imidazoles, lead octoate, alkali metal salts, calcium carbonate, ferric acetylacetonate and 4-alkyl pyridines wherein the alkyl group has one to four carbon atoms.

10. The binder defined in claim 9, wherein the 4-alkyl pyridines are selected from the group consisting of phenyl pyridine, acridine, 2-methoxypyridine, pyridazine, 3-chloropyridine, quinoline, 4,4-dipyridine, 1,4-thiazine and 4-phenylpropylpyridine.

11. The binder defined in claim 1, wherein the catalyst is 4-phenylpropylpyridine.

12. The binder defined in claim 1, wherein the catalyst is selected from the group consisting of triethylamine, dimethylethylamine, trimethyl amine and mixtures thereof.

13. A mouldable mixture comprising:
a particulate aggregate; and
a chemical binder comprising: an ester-based polyol; an isocyanate; and a catalyst capable of catalyzing a reaction between the ester-based polyol and the isocyanate;
wherein the ester-based polyol consists essentially of a reaction product produced by reacting an alcohol with an aromatic compound selected from the group consisting of polyethylene terephthalate, phthalic anhydride, dimethyl terephthalate, terephthalic acid and mixtures thereof.

14. The mixture defined in claim 13, wherein the ester-based polyol has a hydroxyl number in the range of from about 400 to about 600.

15. The mixture defined in claim 13, wherein the polyol contains a polyhydroxy functional group derived from a hydroxyl-containing compound.

16. The mixture defined in claim 15, wherein the hydroxyl-containing compound is selected from the group consisting of 1,3-butane diol, 1,4-butane diol, 1,2-cyclohexanedimethanol, 1,3-cyclohexanedimethanol, 1,4-cyclohexanedimethanol, dimethylol propionic acid, dipropylene glycol, ethylene glycol, 1,6-hexanediol, hexylene glycol, neopentyl glycol, 1,5-pentanediol, propylene glycol, tetraethylene glycol, triethylene glycol, trimethylene glycol, trimethylpentanediol, glycerine, trimethylol ethane, trimethylol propane, pentaerythritol and mixtures of two or more of these.

17. The mixture defined in claim 13, wherein the isocyanate is selected from the group consisting of 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitolylene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polyisocyanates and mixtures thereof.

18. The mixture defined in claim 13, wherein the isocyanate is selected from the group consisting of 2,4-toluene diisocyanate, 2,6-toluene diisocyanate and mixtures thereof.

19. The mixture defined in claim 13, wherein the isocyanate is selected from the group consisting of 2,4'-diphenylmethane diisocyanate, 4,4'-diphenylmethane diisocyanate and mixtures thereof.

20. The mixture defined in claim 13, wherein the isocyanate is a mixture comprising from about 15 to about 25 percent by weight 2,4'-diphenylmethane diisocyanate and from about 75 to about 85 percent by weight 4,4'-diphenylmethane diisocyanate.

21. The mixture defined in claim 13, wherein the catalyst is selected from the group consisting of N,N-dimethylaminoethanol, N,N-dimethylcyclohexylamine, bis-(2-dimethylaminoethyl) ether, N,N,N',N',N"-pentamethyldiethylene triamine, N,N-dimethylbenzylamine, N,N-dimethylcetylamine, diaminobicyclooctane, potassium octoate, potassium acetate, stannous octoate, dibutyltin dilaurate, dibutyltin mercaptide, dibutyltin thiocarboxylates, dioctyltin thiocarboxylates, phenylmercuric propionate, imidazoles, substituted imidazoles, lead octoate, alkali metal salts, calcium carbonate, ferric acetylacetonate and 4-alkyl pyridines wherein the alkyl group has one to four carbon atoms.

22. The mixture defined in claim 21, wherein the 4-alkyl pyridines are selected from the group consisting of phenyl pyridine, acridine, 2-methoxypyridine, pyridazine, 3-chloropyridine, quinoline, 4,4-dipyridine, 1,4-thiazine and 4-phenylpropylpyridine.

23. The mixture defined in claim 13, wherein the catalyst is 4-phenylpropylpyridine.

24. A mouldable mixture comprising:
a particulate aggregate; and
a chemical binder comprising: an ester-based polyol; an isocyanate; and a catalyst capable of catalyzing a reaction between the ester-based polyol and the isocyanate;
wherein the ester-based polyol consists essentially of a reaction product produced by reacting diethylene glycol and polyethylene terphthalate.

25. A process for producing a free-standing mould comprising the steps of:
providing a mouldable composition comprising a particulate aggregate and a chemical binder, the chemical binder comprising: an ester-based polyol consisting essentially of a reaction product produced by reacting an alcohol with an aromatic compound; an isocyanate; and a catalyst capable of catalyzing a reaction between the ester-based polyol and the isocyanate;
shaping the mouldable composition to provide a mould; and
allowing the mould to cure to provide a free-standing mould.

26. The process defined in claim 25, wherein the catalyst is selected from the group consisting of N,N-dimethylamino-ethanol, N,N-dimethylcyclohexylamine, bis-(2-dimethylaminoethyl) ether, N,N,N',N',N"-pentamethyldiethylene triamine, N,N-dimethylbenzylamine, N,N-dimethylcetylamine, diaminobicyclo-octane, potassium octoate, potassium acetate, stannous octoate, dibutyltin dilaurate, dibutyltin mercaptide, dibutyltin thio-carboxylates, dioctyltin thiocarboxylates, phenylmercuric propionate, imidazoles, lead octoate, alkali metal salts, calcium carbonate, ferric acetylacetonate, 4-alkyl pyridine wherein the alkyl group has one to four carbon atoms and mixtures thereof.

27. The process defined in claim 26, wherein the 4-alkyl pyridine is selected from the group consisting of phenyl pyridine, acridine, 2-methoxypyridine, pyridazine, 3-chloropyridine, quinoline, 4,4-dipyridine, 1,4-thiazine, 4-phenylpropylpyridine and mixtures thereof.

28. The process defined in claim 25, wherein the catalyst is 4-phenylpropylpyridine.

29. The process defined in claim 25, wherein the chemical binder comprises from about 35 to about 65 percent by weight ester-based polyol and from about 65 to about 35 percent by weight isocyanate, the catalyst is present in amount of from about 1 to about 10 percent by weight based on the weight of the chemical binder.

30. The process defined in claim 25, wherein the chemical binder comprises from about 40 to about 60 percent by weight ester-based polyol and from about 60 to about 40 percent by weight isocyanate, the catalyst is present in amount of from about 1 to about 8 percent by weight based on the weight of the chemical binder.

31. The process defined in claim 25, wherein the chemical binder comprises from about 46 to about 54 percent by weight ester-based polyol and from about 54 to about 46 percent by weight isocyanate, the catalyst is present in amount of from about 2 to about 6 percent by weight based on the weight of the chemical binder.

32. The process defined in claim 25, wherein the ester-based polyol is produced by reacting diethylene glycol and polyethylene terephthalate.

33. The process defined in claim 32, wherein the catalyst is selected from the group consisting of triethylamine, dimethylethylamine, trimethyl amine and mixtures thereof.

34. The process defined in claim 25, wherein the ester-based polyol is produced by reacting diethylene glycol and polyethylene terephthalate.

35. A process for producing a free-standing mould comprising the steps of:

providing a mouldable composition comprising a particulate aggregate, an ester-based polyol and an isocyanate;

shaping the mouldable composition to provide a mould;

diffusing through the mould a catalyst capable of catalyzing a reaction between the ester-based polyol and the isocyanate; and allowing the mould to cure to provide a free-standing mould;

wherein the ester-based polyol consists essentially of a reaction product produced by reacting an alcohol with an aromatic compound selected from the group consisting of polyethylene terephthalate, phthalic anhydride, dimethyl terephthalate, terephthalic acid and mixtures thereof.

36. The process defined in claim 35, wherein the catalyst is diluted with a carrier gas.

37. A mouldable mixture comprising:

a particulate aggregate; and a chemical binder comprising: an ester-based polyol; an isocyanate; and a catalyst capable of catalyzing a reaction between the ester-based polyol and the isocyanate;

wherein the ester-based polyol consists essentially of a reaction product produced by reacting an alcohol with an aromatic compound selected from the group consisting of polyethylene terephthalate, phthalic anhydride, dimethyl terephthalate, terephthalic acid and mixtures thereof, wherein the alcohol contains a polyhydroxy functional group derived from a hydroxyl-containing compound is selected from the group consisting of 1,3-butane diol, 1,4-butane diol, 1,2-cyclohexanedimethanol, 1,3-cyclohexanedimethanol, 1,4-cyclohexanedimethanol, dimethylol propionic acid, dipropylene glycol, ethylene glycol, diethylene glycol, 1,6-hexanediol, hexylene glycol, neopentyl glycol, 1,5-pentanediol, propylene glycol, tetraethylene glycol, triethylene glycol, trimethylene glycol, trimethylpentanediol, glycerin, trimethylol ethane, trimethylol propane, pentaerythritol and mixtures of two or more of these.

* * * * *